(12) United States Patent
Okamoto et al.

(10) Patent No.: US 6,912,001 B2
(45) Date of Patent: Jun. 28, 2005

(54) IMAGE PROCESSOR AND MONITORING SYSTEM

(75) Inventors: Shusaku Okamoto, Osaka (JP); Masamichi Nakagawa, Osaka (JP); Hirofumi Ishii, Kanagawa (JP); Kunio Nobori, Osaka (JP); Atsushi Morimura, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 744 days.

(21) Appl. No.: 09/866,082

(22) Filed: May 25, 2001

(65) Prior Publication Data

US 2002/0039136 A1 Apr. 4, 2002

(30) Foreign Application Priority Data

May 26, 2000 (JP) ........................................ 2000-155898

(51) Int. Cl.⁷ ............................ H04N 5/228; H04N 9/47
(52) U.S. Cl. ...................... 348/222.1; 348/148; 348/149
(58) Field of Search ............................. 348/222.1, 148, 348/149, 152, 159, 153; 340/461, 901

(56) References Cited

U.S. PATENT DOCUMENTS

| | | | | |
|---|---|---|---|---|
| 5,430,431 A | * | 7/1995 | Nelson ........................ | 340/434 |
| 5,670,935 A | * | 9/1997 | Schofield et al. ........... | 340/461 |
| 5,680,123 A | * | 10/1997 | Lee ............................. | 340/937 |
| 6,396,535 B1 | * | 5/2002 | Waters ........................ | 348/159 |
| 6,693,524 B1 | * | 2/2004 | Payne ......................... | 340/463 |

FOREIGN PATENT DOCUMENTS

| | | | | |
|---|---|---|---|---|
| EP | 0 700 212 A1 | | 3/1996 | |
| EP | 700212 A1 | * | 3/1996 | ............ H04N/7/18 |
| JP | 63-146710 A | | 9/1988 | |
| JP | 01-123587 A | | 5/1989 | |
| JP | 08048198 A | * | 2/1996 | ............ B60R/21/00 |
| JP | 10257482 A | * | 9/1998 | ............ H04N/7/18 |
| JP | 10262240 | | 9/1998 | |
| JP | 10262240 A | * | 9/1998 | ............ H04N/7/18 |
| JP | 11055656 A | * | 2/1999 | ............ H04N/7/18 |
| JP | 11-078692 | | 3/1999 | |
| WO | WO 00/07373 | | 2/2000 | |

* cited by examiner

*Primary Examiner*—Thai Tran
*Assistant Examiner*—Lin Ye
(74) *Attorney, Agent, or Firm*—Harness, Dickey & Pierce, P.L.C.

(57) ABSTRACT

In an image processor for synthesizing images that have been taken by multiple cameras mounted on a vehicle, even if any movable part of the vehicle has changed its state, the synthesized image will have no unnatural part. A pixel synthesizer receives the images that have been captured by the cameras included in an imaging section and generates the synthesized image by reference to a mapping table. Receiving a signal indicative of the state of a movable part such as the door or hood of the vehicle, a display mode changer disables at least one of the cameras that is taking an image to be affected by any change in the state of the movable part. For that purpose, the changer rewrites mapping data stored on the mapping table and thereby eliminates the image in question from the synthesized image.

12 Claims, 10 Drawing Sheets under consideration. Thus, even if the synthesized image has become partially unnatural due to a change in the state of one of the vehicle movable parts, the unnatural part will not be displayed. Alternatively, the user will know quickly and timely that the vehicle's movable part is now in a state unfavorable to running.

IMAGE PROCESSOR AND MONITORING SYSTEM

BACKGROUND OF THE INVENTION

The present invention relates to a technique of generating a synthesized image from multiple images that have been captured by cameras mounted on a vehicle, and more particularly relates to a technique effectively applicable to a monitoring system used as an safety check aid during vehicle driving.

A vehicle video monitoring system disclosed in Japanese Laid-Open Publication No. 11-78692 is one of the known systems for monitoring the surroundings of a running vehicle using cameras. In this system, a vehicle is equipped with multiple cameras, which are mounted here and there on the vehicle body to take a video of its surroundings. The respective images taken by these cameras are transformed and synthesized together while maintaining boundary continuity between them, thereby making a newly synthesized image and displaying it on the monitor screen.

A vehicle surrounding monitoring system of this type, however, will normally carry out the image processing on the supposition that each camera once mounted should be unable to change its position or the direction it faces. This is because it is practically impossible, or at least extremely difficult, to process multiple images for a synthesized image in real time with the continuously changing positions and directions of the cameras taken into account. The reason is that it takes too much time to perform that complicated processing and that the size and ability of such a system are limited.

On the other hand, considering the aerodynamics and design of a vehicle, it is highly probable that those cameras for use in such a monitoring system are mounted on various movable parts of the vehicle. For example, those cameras may be mounted around the rearview mirrors or on the trunk or hood of the vehicle.

Then, the following problems arise.

Specifically, when any of those movable parts, on which the camera is mounted, changes its state (e.g., moves), the image taken by that camera is affected by the change to possibly misalign the image that forms an integral part of the resultant synthesized image. For example, where a camera is mounted around an outside rearview mirror, the opening of a door with the mirror changes the direction the camera faces. As a result, only a portion of the synthesized image, corresponding to the image taken by the camera in question, misaligns, thus making the image on the screen unnatural to the viewer.

In addition, even if one of those cameras is mounted on a fixed part of the vehicle, a similar phenomenon is observed. For example, when a particular camera takes a video of an opening door, only a portion of the synthesized image, corresponding to the image taken by the camera, also misaligns. Such partial misalignment makes the synthesized image unnatural to the viewer and should be eliminated.

SUMMARY OF THE INVENTION

An object of the invention is to make a synthesized image, generated by an image processor from multiple images taken by cameras on a vehicle, as natural to a viewer as possible even if any of those images is affected by a state change of a movable part of the vehicle.

Specifically, an inventive image processor includes an image processing section, which receives multiple images that have been taken by cameras mounted on a vehicle to monitor surroundings of the vehicle, generates a synthesized image from the images and then output the synthesized image to a display device. The image processing section switches display modes of the synthesized image in accordance with a state of a movable part of the vehicle.

In the present invention, the display modes of a synthesized image are switched in accordance with a state of a movable part of a vehicle. Accordingly, even if the synthesized image has become partially unnatural to a viewer due to a change in the state of the vehicle movable part, the unnatural image will not be displayed. Also, by switching the display modes of the synthesized image, it is possible to let the user know quickly and timely that the movable part is now in a state unfavorable to the vehicle's running, for example.

In one embodiment of the present invention, if a change in the state of the movable part has altered the position or direction of at least one of the cameras to make the synthesized image unnatural, the image processing section preferably switches the display modes of the synthesized image from a normal mode into an alert mode.

In this particular embodiment, the image processing section may generate the synthesized image in the alert mode without using the image taken by the camera that has had its position or direction changed.

Alternatively, the image processing section may output no synthesized image in the alert mode.

As another alternative, the image processing section may also output an alert message instead of, or along with, the synthesized image in the alert mode. Then, the user can quickly sense the unnaturalness of the synthesized image thanks to the alert message. Also, where the alert message displayed indicates exactly how the movable part has changed its state, the user can know the current situation of the vehicle quickly and timely.

In another embodiment of the present invention, if, due to a change in the state of the movable part, the image of the movable part occupies a different portion of the image taken by at least one of the cameras to make the synthesized image unnatural, the image processing section preferably switches the display modes of the synthesized image from a normal mode into an alert mode.

In this particular embodiment, the image processing section may generate the synthesized image in the alert mode without using the image which has been taken by the camera and the different portion of which the image of the movable part now occupies.

Alternatively, the image processing section may output no synthesized image in the alert mode.

As another alternative, the image processing section may output an alert message instead of, or along with, the synthesized image in the alert mode. Then, the user can quickly sense the unnaturalness of the synthesized image thanks to the alert message. Also, where the alert message displayed indicates exactly how the movable part has changed its state, the user can know the current situation of the vehicle quickly and timely.

In still another embodiment, the movable part may include at least doors, hood and trunk of the vehicle. In that case, the image processing section may switch the display modes of the synthesized image in accordance with opening and closing of the doors, hood or trunk.

In yet another embodiment, the movable part may include at least tires of the vehicle. In that case, the image processing section may switch the display modes of the synthesized image in accordance with a steering angle of wheels on which the tires are fitted.

A monitoring system according to the present invention includes the inventive image processor. The system includes: multiple cameras, mounted on a vehicle, for taking images of surroundings of the vehicle; a display device; and an image processing section. The image processing section receives the images taken by the cameras, generates a synthesized image from these images and then outputs the synthesized image to the display device. The image processing section switches display modes of the synthesized image in accordance with a state of a movable part of the vehicle.

DESCRIPTION OF THE PREFERRED EMBODIMENTS

Hereinafter, preferred embodiments of the present invention will be described with reference to the accompanying drawings.

Embodiment 1

Figure 1:
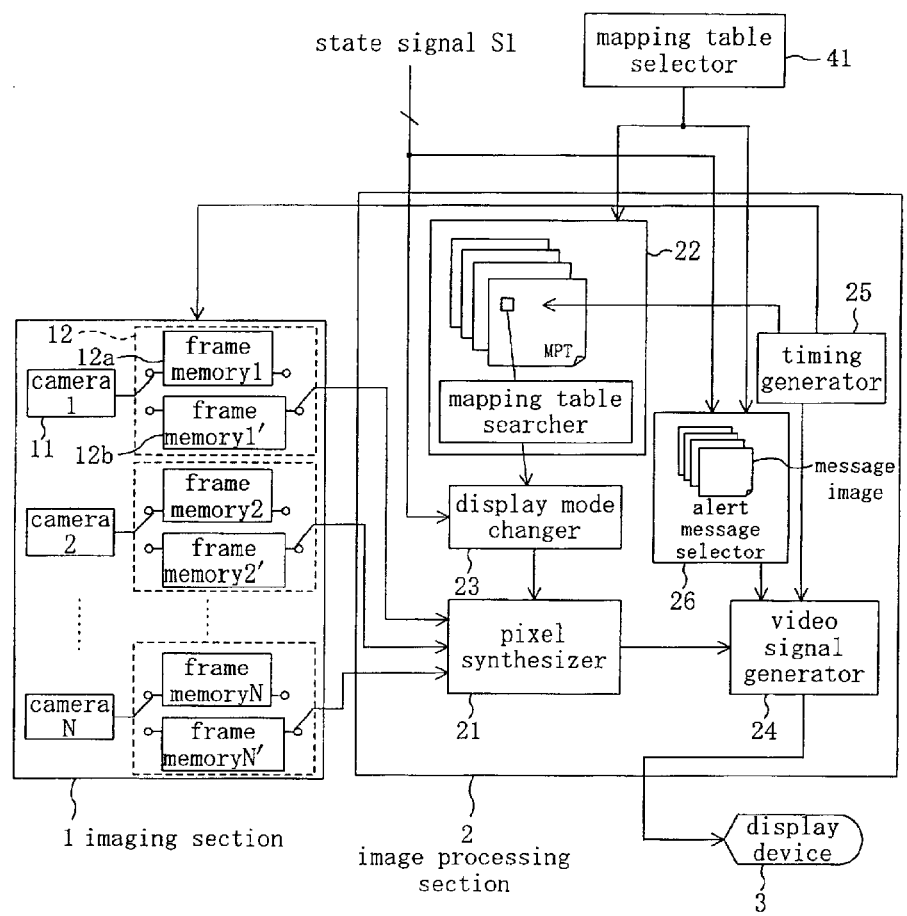
FIG. 1 is a block diagram illustrating a configuration for a monitoring system according to a first embodiment of the present invention.

FIG. 1 is a block diagram illustrating a configuration for a monitoring system according to a first embodiment of the present invention. In the monitoring system shown in FIG. 1, an image processing section 2 receives multiple camera images that an imaging section 1 has output, and combines these images together to generate a newly synthesized image, which will be presented on a display device 3. That is to say, the image processing section 2 is the core of the inventive image processor.

The following Table 1 shows where the cameras may be mounted according to the first embodiment:

TABLE 1

| Camera No. | Position |
|---|---|
| 0 | Hood |
| 1 | Right door front |
| 2 | Right door rear |
| 3 | Trunk |
| 4 | Hood |
| 5 | Left door front |
| 6 | Left door rear |
| 7 | Trunk |

Figure 2:
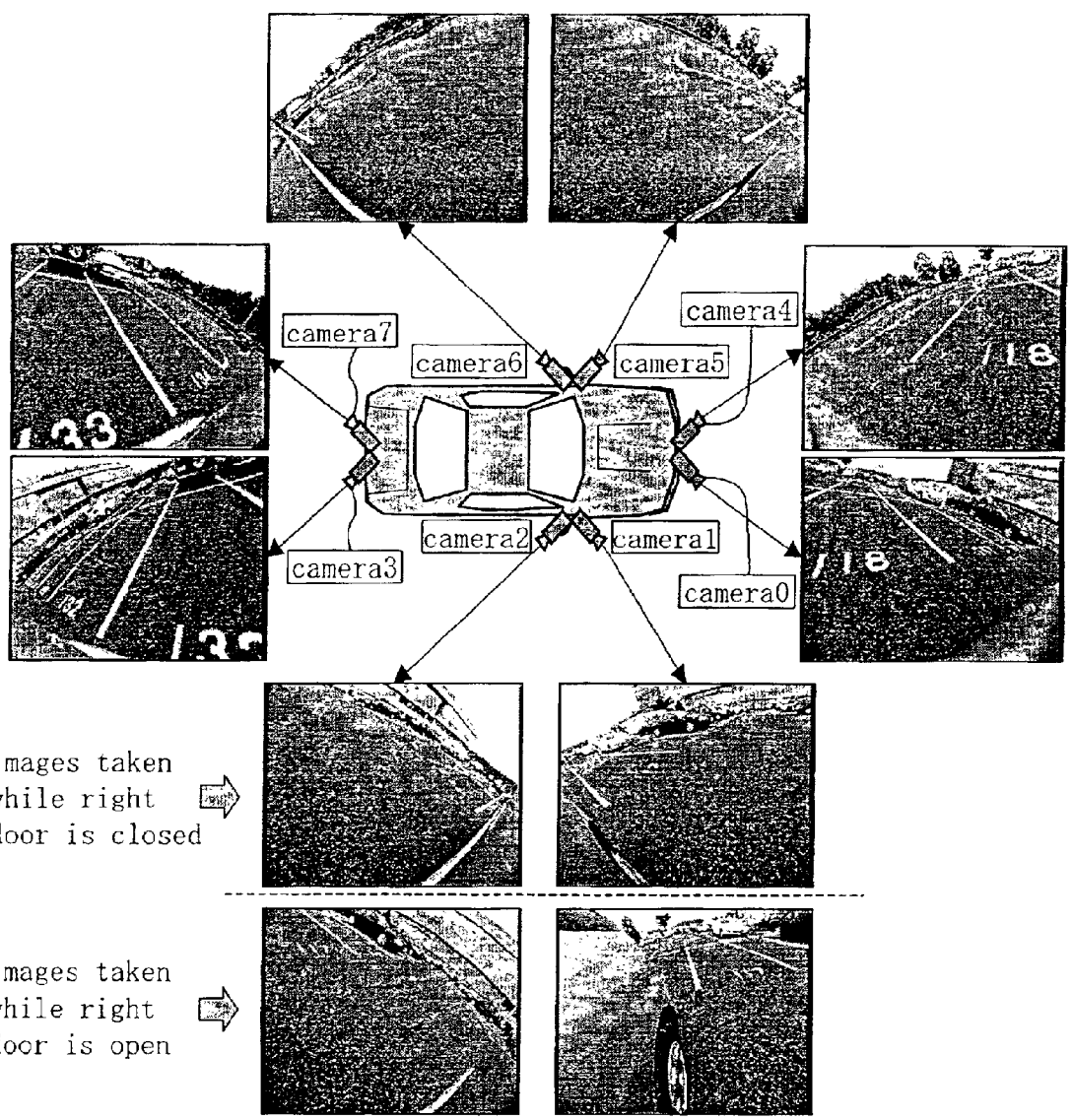
FIG. 2 illustrates an exemplary arrangement of cameras and exemplary images taken by the cameras according to the first embodiment.

FIG. 2 illustrates this exemplary camera arrangement along with exemplary images taken by these cameras in this embodiment. In the illustrated embodiment, the eight cameras are mounted as shown in Table 1 and FIG. 2. When the camera arrangement shown in Table 1 and FIG. 2 is employed, the positions and directions of the respective cameras are preferably determined so that the images taken by an adjacent pair of cameras share some image portion to eliminate blind spots for the viewer as much as possible.

The image processing section 2 transforms and combines together the eight camera images shown in FIG. 2, thereby generating a synthesized image of the vehicle as viewed vertically from over it, for example. To generate the synthesized image, the image transformation and synthesis of the transformed partial images (including boundary processing) are needed. In the system shown in FIG. 1, the image processing section 2 includes a mapping table searcher 22. And to process those images by a single process step, the image processing section 2 uses a mapping table MPT, which will be described in detail later.

A mapping table selector 41 selects the type of a synthesized image to be displayed and specifies one of the mapping tables MPT in accordance with the type of the image in need. This selection may be carried out either manually or automatically depending on the condition of the vehicle (e.g., gear position, steering angle or the ON/OFF states of blinkers). A signal specifying the mapping table MPT to be selected is also output to an alert message selector 26 as well as to the mapping table searcher 22.

Responsive to a state signal S1 indicating the current state of a vehicle movable part, a display mode changer 23 switches the display modes of the synthesized image. For example, if a change in the state of the movable part has altered the position or direction of one of the cameras to make the synthesized image unnatural, the changer 23 switches the display modes of the synthesized image from a normal mode into an alert mode. In the alert mode, the synthesized image is generated without using the image taken by the camera in question that has had its position or direction changed.

Figure 3:
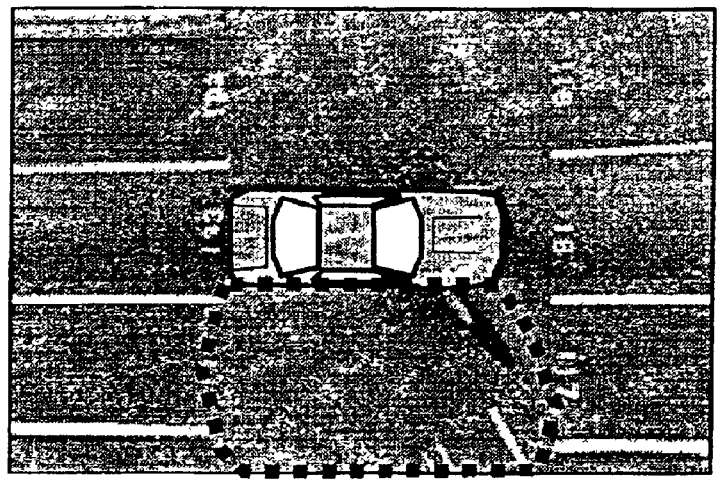
FIG. 3 illustrates an exemplary image, which has become partially unnatural due to a change in the state of a movable part of a vehicle.

FIG. 3 illustrates an exemplary image, which has become partially unnatural due to a change in the state of a vehicle movable part. As can be seen from the synthesized image shown in FIG. 3, the images taken by cameras Nos. 1 and 2 changed because the right door of the vehicle opened, and part of the synthesized image, corresponding to the images taken by these cameras Nos. 1 and 2, misaligned.

Thus, in the illustrated embodiment, the opened/closed states of the right and left doors, trunk and hood, on which the cameras are mounted, are used as the states of vehicle movable parts. That is to say, the state signal S1, giving information "right door opened" or "hood closed", for example, is input to the display mode changer 23. Data about a correspondence between respective vehicle movable parts and the camera numbers is stored beforehand on the changer 23. The data may be as shown in the following Table 2, for example:

TABLE 2

| Movable part | Cameras mounted |
|---|---|
| Right door | Nos. 1 & 2 |
| Left door | Nos. 5 & 6 |
| Trunk | Nos. 3 & 7 |
| Hood | Nos. 0 & 4 |

In accordance with this correspondence and the information given by the state signal S1, the changer 23 switches the display modes of the synthesized image.

Figure 4A:
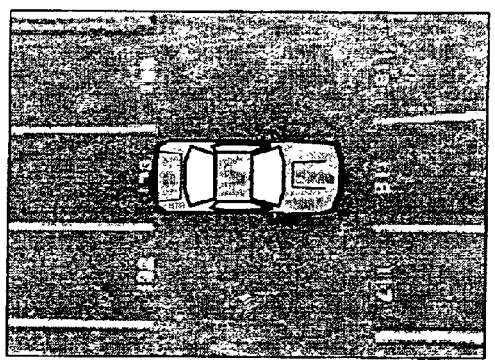
FIGS. 4A through 4D illustrate how the display modes of a synthesized image may be switched in the present invention.
Figure 4B:
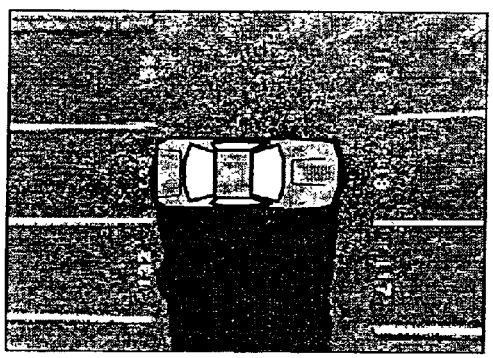

FIGS. 4A through 4D illustrate how the display modes of the synthesized image may be switched in the present invention. Specifically, FIG. 4A illustrates a synthesized image displayed in normal mode. As shown in FIG. 4A, the movable parts of the vehicle are all closed and a natural image is presented. FIG. 4B illustrates an exemplary synthesized image displayed in alert mode. The image shown in FIG. 4B illustrates a situation where the right door of the vehicle opened. In the synthesized image shown in FIG. 4B, the images taken by cameras Nos. 1 and 2, mounted on the right door of the vehicle, are not used for image synthesis and instead part of the synthesized image, corresponding to these images in question, is filled in a predetermined color. Alternatively, that part may be filled with any arbitrary pattern. Also, the colors may be changed at appropriate time intervals.

In the illustrated embodiment, the display modes of the synthesized image are switched by rewriting the mapping data stored on the mapping table MPT.

Optionally, in the alert mode, the output of the synthesized image itself may be suspended or the alert message selector 26 may output an alert message either alone or along with the synthesized image.

Figure 4C:
Figure 4D:
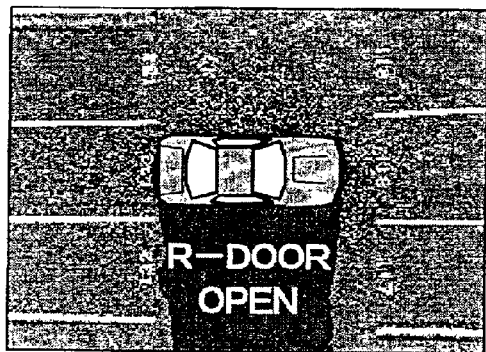

FIG. 4C illustrates one such situation where no synthesized image is displayed but only an alert message, indicating that the right door is open, is presented. On the other hand, FIG. 4D illustrates another such situation where the synthesized image shown in FIG. 4B is displayed along with the alert message shown in FIG. 4C. In this manner, camera images, affectable by any state change of a movable part, may be removed from the image synthesized and an alert message, informing the user of the state change of the movable part (e.g., a door is open), may be presented as shown in FIG. 4D. Then, the user (e.g., driver) of the vehicle can know the current state of his or her own car more quickly and more timely.

The alert message selector 26 stores in advance those alert messages in image formats, for example. On receiving the state signal S1 indicating the current state of a vehicle movable part and the signal output from the mapping table selector 41 to specify a mapping table MPT, the selector 26 selects one of the message images that has to be combined with the synthesized image. Then, the selector 26 sends out the message image to a video signal generator 24.

FIGS. 5A through 5D illustrate examples of the alert message images stored on the selector 26. In the examples illustrated in FIGS. 5A through 5D, the message itself is displayed in white (i.e., (255, 255, 255) where the image is presented in RGB 256 gray scales), while the remaining part of the image is displayed in black (i.e., (0, 0, 0) in that case). Each message image should have the same size as the synthesized image.

The contents and display position of the message included in each message image may differ depending on which mapping table was selected to generate the synthesized image and which movable part changed its state. Accordingly, various alert message images should preferably be prepared for all sorts of imaginable situations and one of those message images should preferably be selectable depending on the particular situation.

The following Table 3 shows a correspondence among the mapping tables for use in image synthesis, various states of the vehicle movable parts and the alert message images to be displayed:

TABLE 3

| Mapping Table | State of movable part | Message image No. |
|---|---|---|
| Look-down | R-Door open | 1 |
| Look-down | L-Door open | 2 |
| Look-down | Trunk open | 3 |
| Look-down | Hood open | 4 |
| Blind corner monitor | Hood open | 5 |
| Rearview monitor | Trunk open | 6 |
| * | All closed | 7 |

Figure 5A:
FIGS. 5A through 5D illustrate examples of alert message images.

For example, the second row of this Table 3 indicates that the mapping table now selected is for use to generate a "look-down" image and that if the right door, one of the vehicle's movable parts, is open, alert message image No. 1 should be selected. FIG. 5A illustrates an exemplary alert message image No. 1. In this situation, i.e., where the mapping table currently selected will be used to generate a "look-down" image and the right door is open, the images taken by the cameras mounted on the right door will not be used for image synthesis. Accordingly, the alert message shown in FIG. 5A saying "R-Door Open" will be posted in part of the synthesized image where the images taken by the cameras mounted on the right door should be displayed.

The alert message selector 26 stores beforehand information such as that shown in Table 3. Responsive to the state signal S1 indicating the current state of the vehicle movable part and the signal specifying one of the mapping tables MPT, the selector 26 selects and outputs one of the message images to be posted. On receiving the message image from the selector 26, the video signal generator 24 superimposes the message image on the synthesized image output from a pixel synthesizer 21 and then displays the resultant combined image.

The message image may be superimposed on the synthesized image by retrieving the RGB values of all pixels for the synthesized and message images and outputting the greater ones, for example. When this method is applied to the message image shown in FIG. 5A, the black pixel portions of the message image have RGB values smaller than those of the synthesized image in the associated portions. Accordingly, the RGB values of the synthesized image will be chosen. On the other hand, as for the white pixel portions of the message image, the RGB values of the message image will always be chosen. In this manner, a combined image, in which only the message portions are superimposed on the synthesized image, can be obtained. In this case, part of the synthesized image where the camera images should not exist is preferably filled in a dark color to make the message superimposed in white as easily visible as possible.

Figure 5B:
Figure 5C:
Figure 5D:

Also, if a combined image should be displayed by this superimposition method in a situation where all the movable parts are closed (i.e., in the normal mode), the image filled in black (0, 0, 0) such as that shown in FIG. 5B may be used as the message image. That is to say, the image shown in FIG. 5B may be prepared as message image No. 7 shown on the lower-most row of Table 3. Naturally, the message selector 26 may output no message image in the normal mode.

Also, where a number of movable parts are open, the following technique may be used. For example, if the mapping table now selected is for use to generate a "lookdown" image and if the right and left doors are both open currently, then the message selector 26 selects the associated alert message images Nos. 1 and 2 shown in FIGS. 5A and 5C, respectively. Then, the message selector 26 retrieves the RGB values of all pixels for images Nos. 1 and 2 and chooses the greater values, thereby generating a newly combined message image shown in FIG. 5D, for example, and sending out the message image to the video signal generator 24.

In the foregoing illustrative embodiment, the alert message image contains alphabetical letters. Alternatively, the alert message may be a simplified diagram or illustration. Also, if no message images are to be displayed in the alert mode, then the alert message selector 26 may be naturally omitted.

Hereinafter, it will be described in detail how to rewrite the mapping data.

As used herein, the "mapping table" means a table describing the correspondence between each pixel included in a synthesized image and associated pixel data included in any of the camera images. The mapping table is used to speed up the synthesized image generation.

There may be either one-to-one correspondence or multiple-to-one correspondence between pixel(s) included in each camera image and associated pixel included in the synthesized image. The type of correspondence is changeable depending on the position of a particular camera or the type of the synthesized image to be generated. For example, where boundary processing should be carried out for a boundary between multiple camera images, the multiple-to-one correspondence often has to be defined between pixels included in a plurality of camera images and an associated pixel in the synthesized image.

Figure 6:
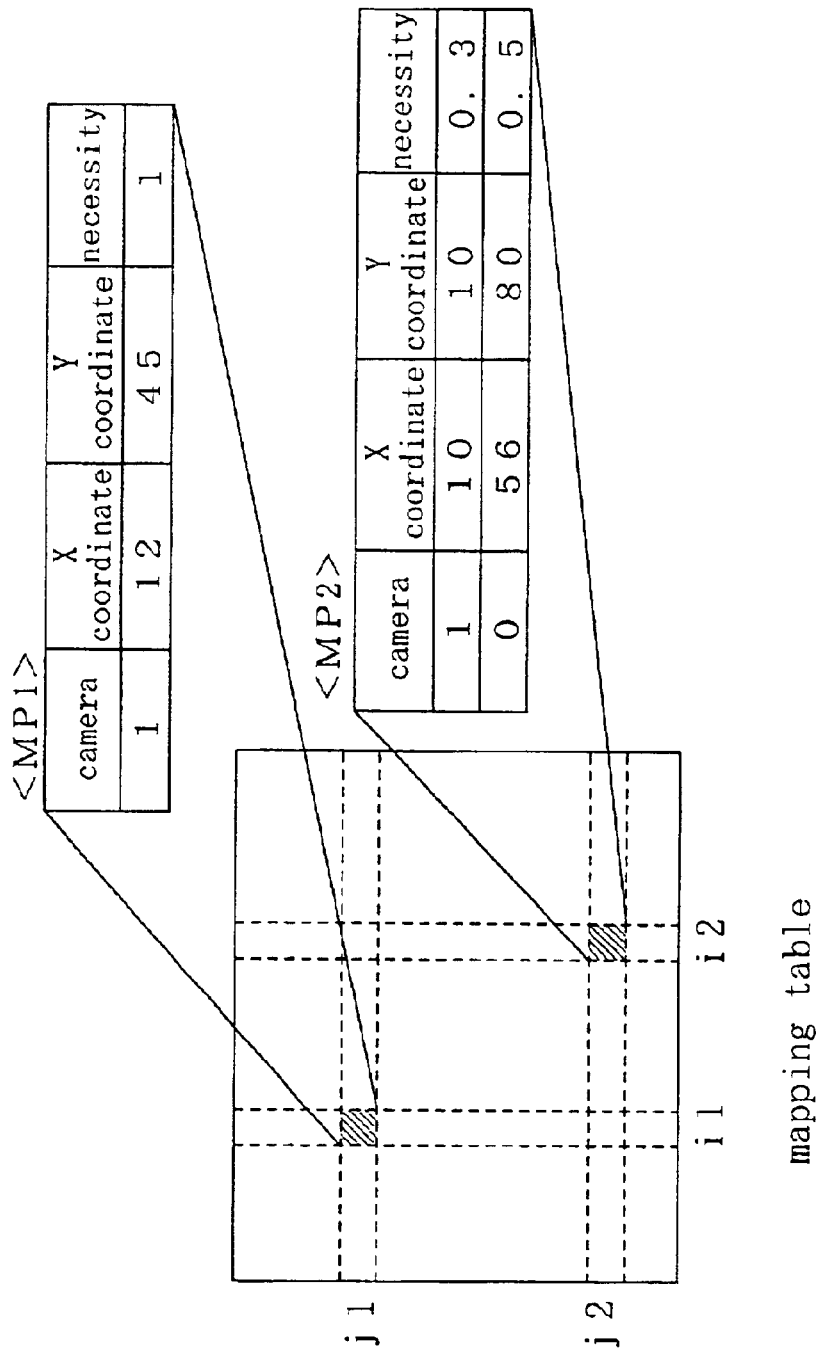
FIG. 6 schematically illustrates an exemplary mapping table.

FIG. 6 schematically illustrates an exemplary mapping table. The table shown in FIG. 6 includes mapping data items corresponding to respective pairs of pixel coordinates (i, j) of the synthesized image.

For example, a mapping data item MP1 associated with pixel coordinates (i1, j1) is included in the mapping table. As can be seen from FIG. 6, this mapping data item MP1 indicates that only the pixel data at the coordinates (12, 45) in the image taken by camera No. 1 is mapped to the pixel (i1, j1) of the synthesized image. This mapping table MPT further indicates a rate of necessity. For the mapping data item MP1, its rate of necessity is "1". So the pixel data at the coordinates (12, 45) in the image taken by camera No. 1 is used as it is as the pixel value at the coordinates (i1, j1) of the synthesized image.

Another mapping data item MP2 associated with pixel coordinates (i2, j2) is also included in this mapping table MPT. This mapping data item MP2 indicates that pixel data at the coordinates (10, 10) in the image taken by camera No. 1 and another pixel data at the coordinates (56, 80) in the image taken by camera No. 0 are mapped to the pixel (i2, j2) of the synthesized image. Using the rates of necessity, the pixel value at the coordinates (i2, j2) in the synthesized image may be given by Pixel value={(pixel value at the coordinates (56, 80) in the image taken by camera No. 1)×0.5+(pixel value at the coordinates (10, 10) in the image taken by camera No. 0)×0.3}/(0.5+0.3)

By preparing mapping tables like this either automatically through computations (e.g., geometric transformation) or manually, any desired synthesized image, representing a plan view, rearview or side view of a vehicle, can be generated quickly enough. Also, by changing the mapping tables for use to generate the synthesized images, the display modes of the synthesized image can be switched easily. This display mode switching may be carried out either manually or automatically in accordance with the state of a vehicle running.

Specifically, the mapping tables may be stored on a ROM, including an electrically erasable and programmable ROM (EEPROM), or on a RAM. The mapping data may be stored there by writing the mapping data, computed by a microprocessor built in the image processing section, on the ROM or RAM, for example. Alternatively, mapping table data, available as firmware, may be written on the ROM or RAM by way of some data transfer means including telecommunications lines or disk drives.

Next, it will be described exactly how to generate a synthesized image using the mapping table MPT and display mode changer 23.

Figure 7:
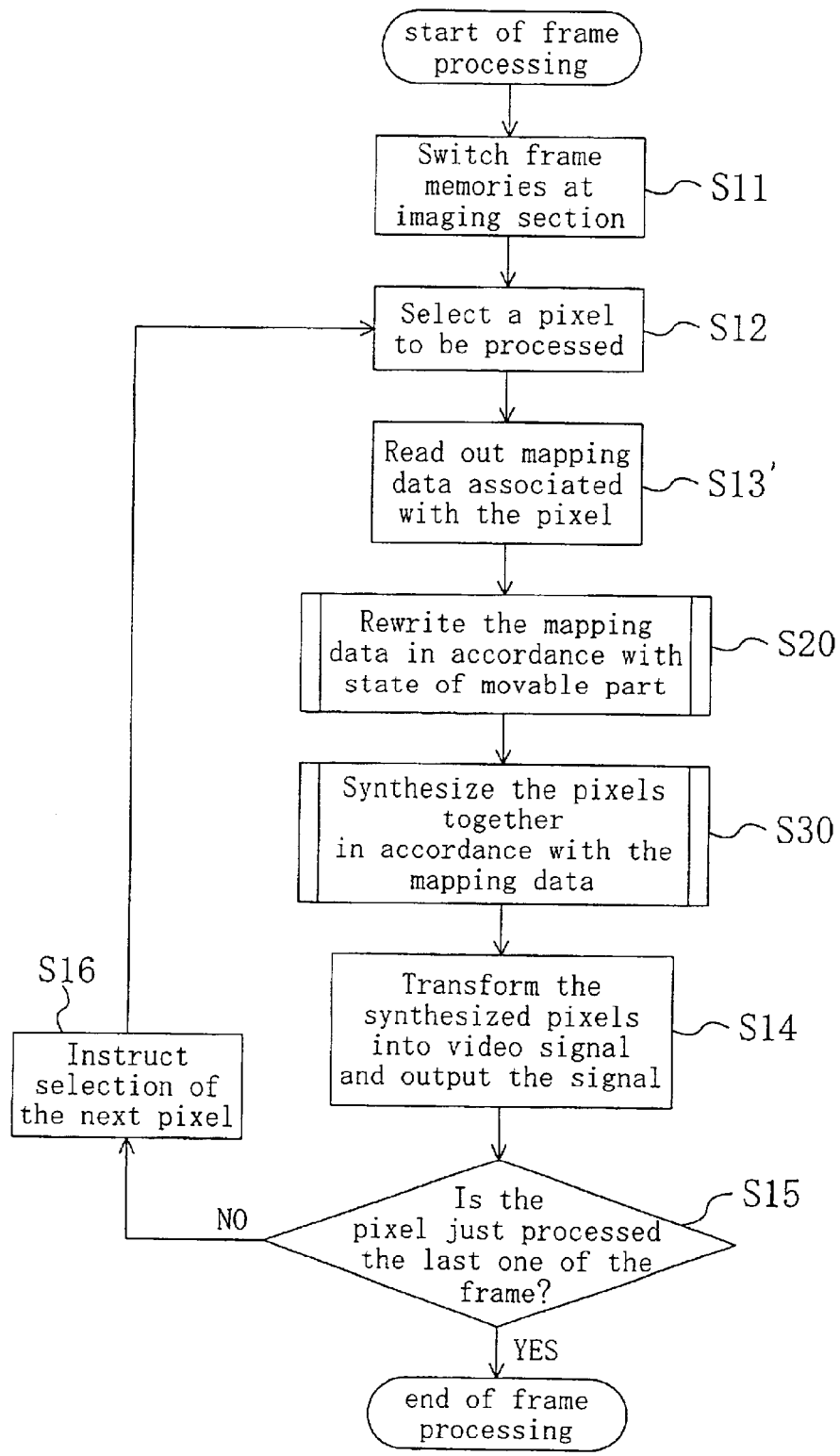
FIG. 7 is a flowchart illustrating an overall image synthesis process.

FIG. 7 is a flowchart illustrating an overall image synthesis process according to this embodiment. First, in Step S11, the imaging section 1 switches frame memories 12a, 12b, etc. A timing generator 25 generates a timing signal to produce a sequence of moving pictures that will represent a synthesized image. Responsive to the timing signal output from the timing generator 25 to indicate the start of framing, the imaging section 1 switches the frame memories 12a, 12b, etc. That is to say, the imaging section 1 selects new combinations of frame memories on which the images taken by the cameras 11 should be written and frame memories on which images to be referenced by the image processing section 2 should be stored. This switching operation is performed to avoid interference between writing and referencing because the pixels to be referenced by the image processing section 2 are randomly located in various camera images irrespective of the order in which the images taken by the cameras 11 are written.

Next, in Step S12, the timing generator 25 selects a pixel to be processed from the synthesized image that will have to be output at the predetermined timing.

Then, in Step S13, the mapping table searcher 22 reads out a mapping data item, associated with the pixel selected by the timing generator 25, from the mapping table MPT specified, and then outputs the data to the display mode changer 23. Responsive to the state signal S1, the changer 23 rewrites, in Step S20 if necessary, the mapping data that has been read out by the mapping table searcher 22 and then outputs the updated data to the pixel synthesizer 21. This Step S20 will be described in further detail later.

Subsequently, in Step S30, in accordance with the mapping data input, the pixel synthesizer 21 synthesizes the pixel value(s) of the associated camera image(s) for the pixel selected by the timing generator 25 with the existent ones and then outputs the result to the video signal generator 24. Next, in Step S14, the video signal generator 24 transforms the input pixel values for the synthesized image into a video signal and outputs the signal to the display device 3 synchronously with the input of the timing signal from the timing generator 25.

Thereafter, the timing generator 25 determines in Step S15 whether or not the pixel that has just been processed is the last one of the given frame. If the answer is YES, then the current frame is regarded as having been processed successfully and processing of the next frame starts.

Otherwise, the process advances to Step S16, in which the selection of the next pixel is instructed. Then, the image processing section 1 performs the series of processing steps S13, S20, S30 and S14 all over again on the next pixel selected by the timing generator 25 in Step S12. And this processing loop will be repeatedly carried out until the answer to the query of Step S15 becomes YES, i.e., until the last pixel of the current frame is processed.

In the illustrated embodiment, the processing is carried out on a frame-by-frame basis, but may naturally be performed on one field after another.

Figure 8:
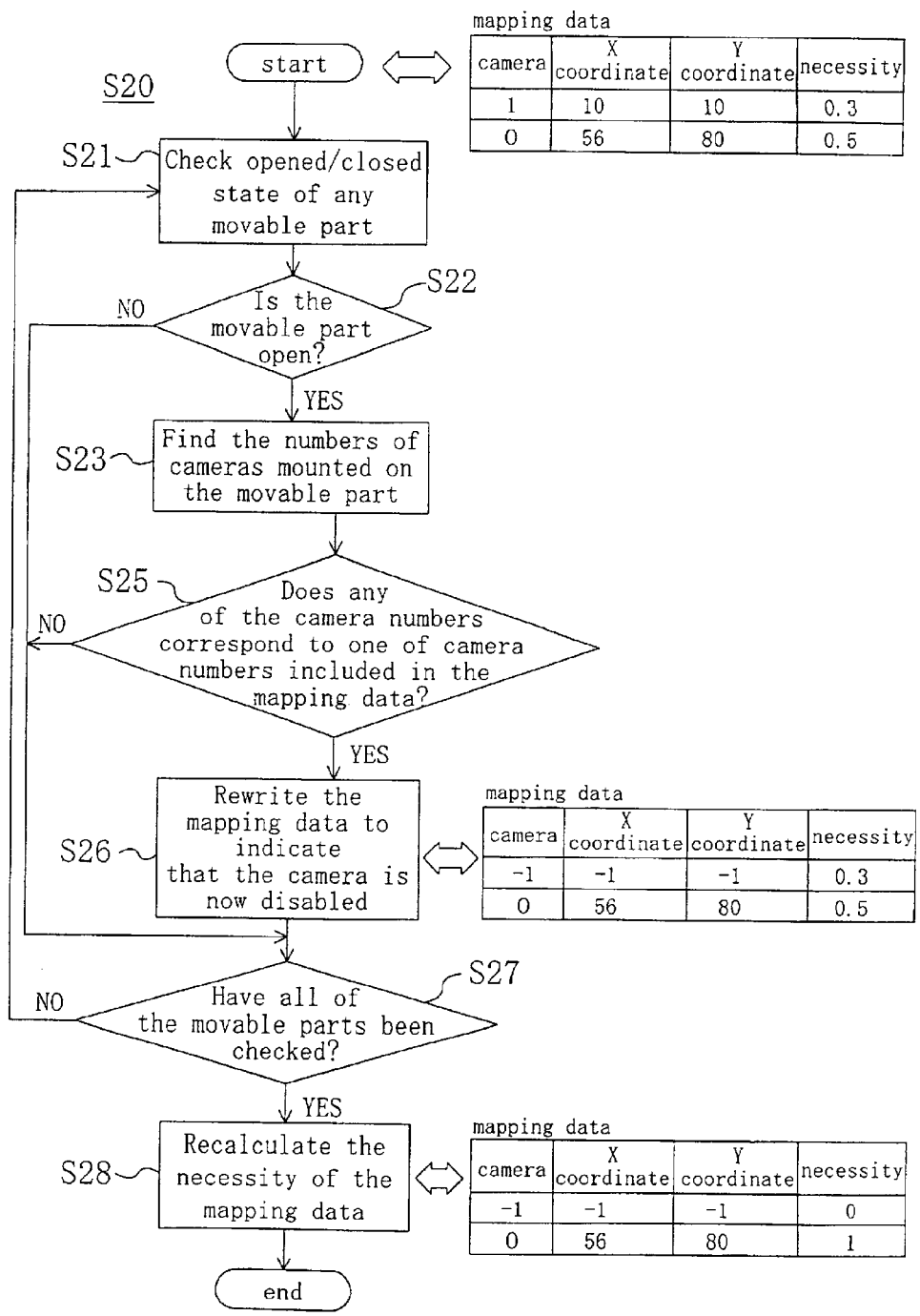
FIG. 8 is a flowchart illustrating the detailed process steps of Step S20 shown in FIG. 7.

FIG. 8 is a flowchart illustrating specifically how the display mode changer 23 operates in Step S20 shown in FIG. 7.

First, in Step S21, the changer 23 checks the information given by the input state signal S1 about the opened/closed state of some vehicle movable part (e.g., right door, left door, trunk or hood). If the movable part is open (i.e., if the answer to the query of Step S22 is YES), then the process advances to Step S23 to know the numbers of the cameras mounted on that movable part by reference to the table (e.g., Table 2) pre-stored on the changer 23. On the other hand, if the movable part is closed (i.e., if the answer to the query of Step S22 is NO), then the process jumps to Step S27, in which the changer 23 determines whether or not all of the movable parts have been checked. If the answer is YES, then the process advances to the next step S28. Otherwise, the process returns to Step S21, in which the changer 23 checks the opened/closed state of another (or the other) movable part.

Once the numbers of the cameras on the movable part in question are known in Step S23, the process advances to the next step S25. In Step S25, the changer 23 determines whether or not any of those camera numbers corresponds to one of the camera numbers included in the mapping data. If the answer is YES, the process advances to the next Step S26, in which the mapping data about the camera with that number is rewritten to indicate that the camera is temporarily disabled. In the example illustrated in FIG. 8, the camera number and the X and Y coordinates are rewritten into "−1". On the other hand, if the answer to the query of Step S25 is NO, then the process jumps to Step S27, in which the changer 23 determines whether or not all of the movable parts have been checked. If the answer is YES, then the process advances to the next step S28. Otherwise, the process returns to Step S21, in which the changer 23 checks the opened/closed state of another (or the other) movable part.

When all of the movable parts have been checked (i.e., when the answer to the query of Step S27 becomes YES), the rates of necessity of the mapping data are re-calculated in Step S28 to end the processing.

Hereinafter, it will be described specifically how the display mode changer 23 operates in this Step S20 where the mapping data item MP2 shown in FIG. 6 is input to the changer 23. In the following example, only the right door of a vehicle is supposed to be opened for illustrative purposes.

First, the state signal S1 tells the changer 23 in Steps S21 and S22 that the right door of the vehicle is open. Thus, by reference to Table 2 stored thereon, the changer 23 knows in Step S23 that cameras Nos. 1 and 2 are mounted on the right door opened.

Next, the changer 23 determines in Step S25 whether or not the camera number "1" or "2" corresponds to one of the camera numbers included in the mapping data item MP2. In this case, the camera number "1" is included in the mapping data item MP2, so in the next step S26, the data stored about the camera No. 1 is rewritten into disabled ones. As for the camera number "2" on the other hand, that number is not included in the mapping data item MP2 and there is no need to rewrite the data about it.

Since the other movable parts are all closed in the illustrated example, the answer to the query of the next step 27 is YES. So the process advances to the next step S28, in which the rates of necessity are recalculated. In the illustrated example, the disabled camera No. 1 has its necessity recalculated as "0" and the other camera No. 0 has its necessity rewritten into "1".

Figure 9:
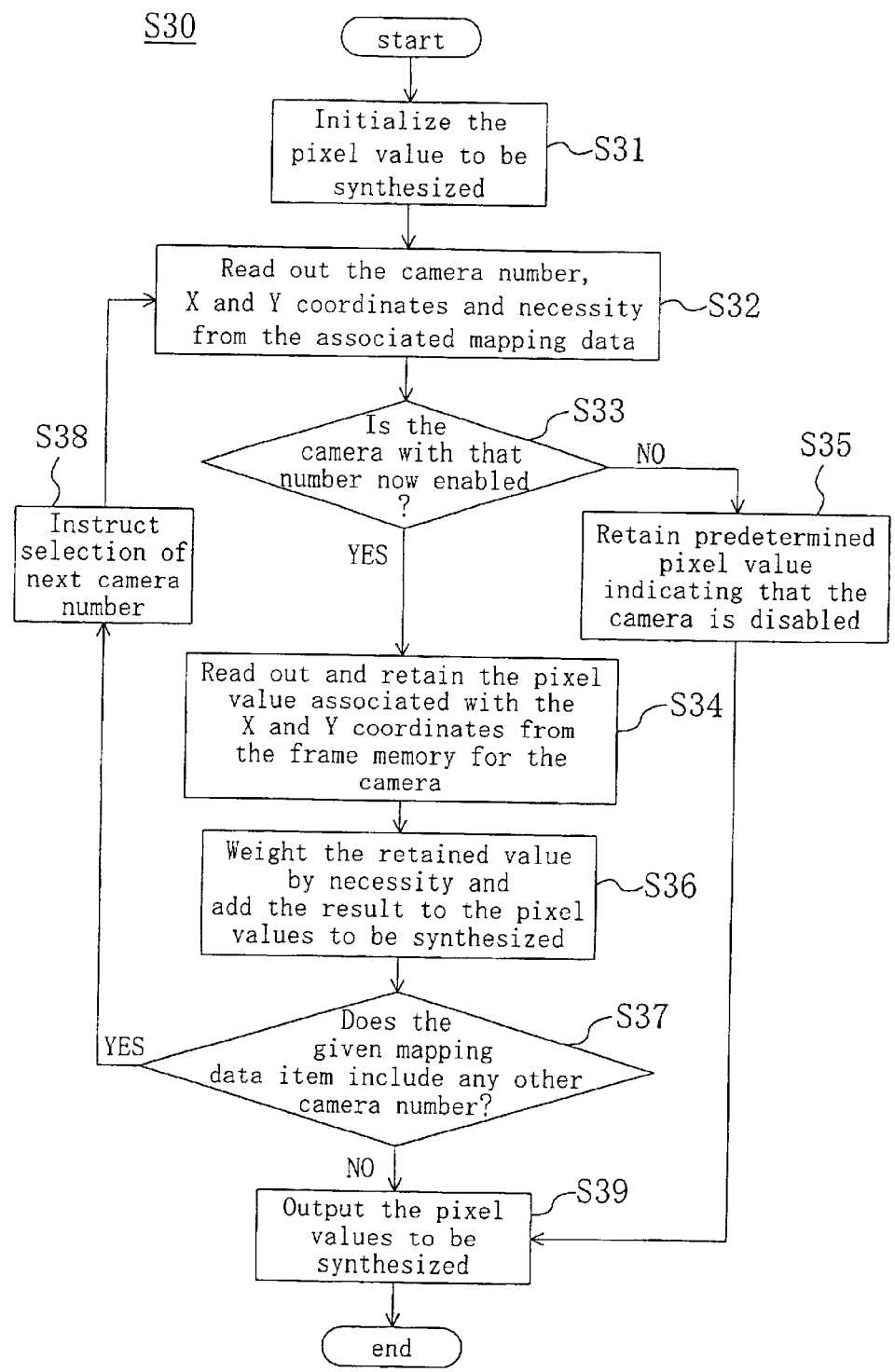
FIG. 9 is a flowchart illustrating the detailed process steps of Step S30 shown in FIG. 7.

FIG. 9 is a flowchart illustrating the pixel synthesizing step S30 shown in FIG. 7.

First, in Step S31, the synthesizer 21 initializes the value of a pixel to be synthesized into "0".

Next, in Step S32, the synthesizer 21 reads out the camera number, X and Y coordinates and rate of necessity from the mapping data item associated with the pixel. If the camera number read out indicates that the camera is now enabled (i.e., if the answer to the query of Step S33 is YES), then the synthesizer 21 reads out and retains in Step S34 the pixel value, defined by the X and Y coordinates, from the image stored on the frame memory for the enabled camera. On the other hand, if the camera number read out indicates that the camera is now disabled (i.e., if the answer to the query of Step S33 is NO), then the synthesizer 21 retains and outputs a predetermined pixel value indicating the disability (e.g., black pixel value) in Steps S35 and S39, respectively.

Where the camera with that number is now enabled, the synthesizer 21 weights the pixel, which has been read out and retained in Step S34, by the rate of necessity and then adds the weighted value to the pixel value to be synthesized in Step S36.

Then, in Step S37, the synthesizer 21 determines whether or not the given mapping data item includes any other camera number. If the answer is YES, then reading a next camera number is instructed in Step S38 and the process returns to Step S32 to make the synthesizer 21 repeatedly perform the processing steps S32 through S36 until the answer to the query of Step S37 becomes NO. When it is found in Step S37 that there is no other camera number left in the mapping data item, the process advances to the next step S39, in which the synthesizer 21 outputs the pixel values to be synthesized.

By switching the display modes of the synthesized image in this manner, no unnatural image will be presented to the viewer even if any movable part of a vehicle has changed its state to make the synthesized image unnatural.

Embodiment 2

Figure 10:
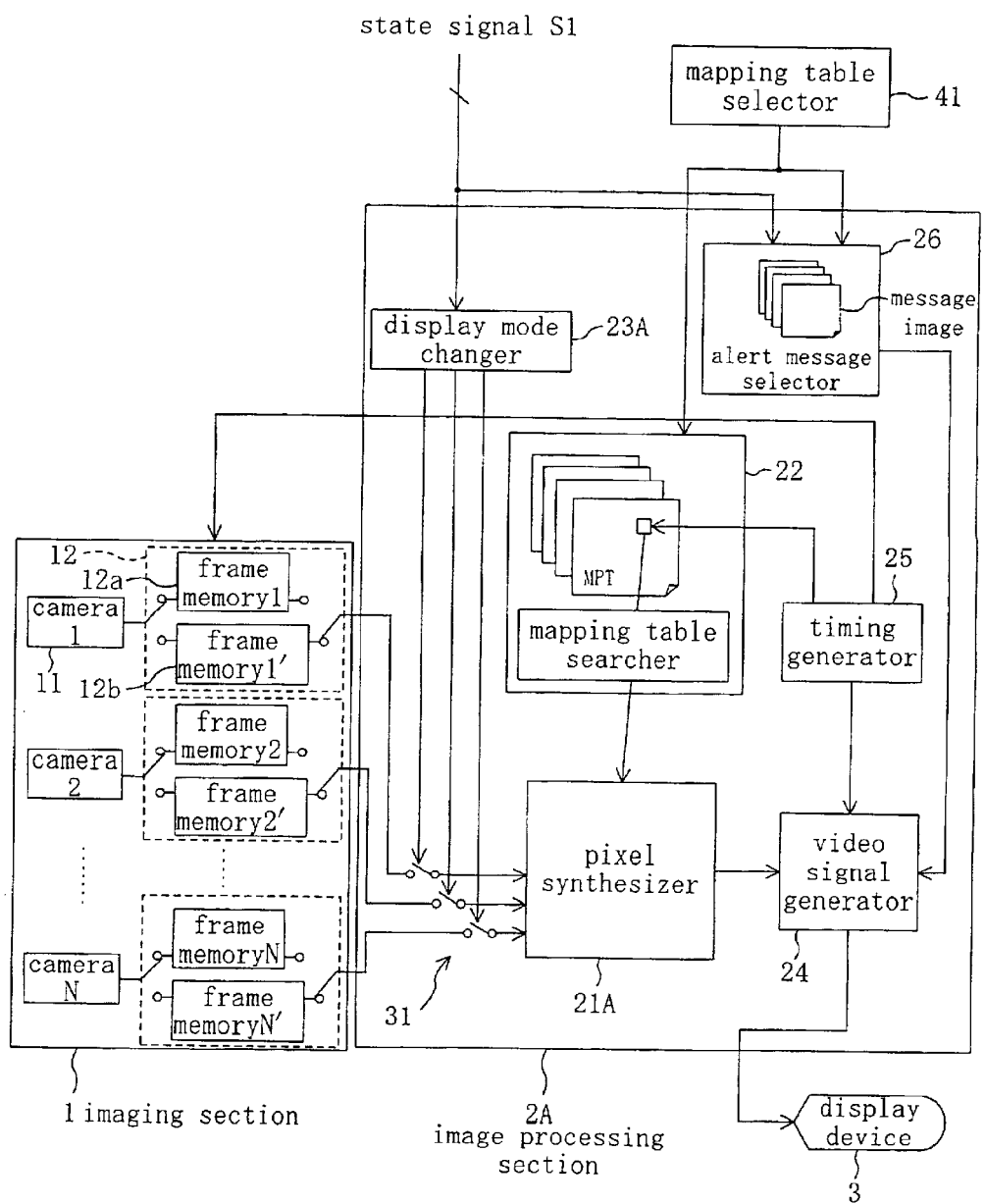
FIG. 10 is a block diagram illustrating a configuration for a monitoring system according to a second embodiment of the present invention.

FIG. 10 is a block diagram illustrating a configuration for a monitoring system according to a second embodiment of the present invention. In FIG. 10, each component also shown in FIG. 1 is identified by the same reference numeral and the detailed description thereof will be omitted herein.

The system shown in FIG. 10 is characterized in that a display mode changer 23A gets camera images selectively input from the imaging section 1 to a pixel synthesizer 21A responsive to the state signal S1, thereby switching the display modes of the synthesized image. That is to say, switches 31 are provided between the output terminals of the imaging section 1 and the input terminals of the pixel synthesizer 21A. On sensing the opened state of any of the movable parts in accordance with the information given by the state signal S1, the changer 23A identifies a disabled camera, not available for generating a synthesized image, by reference to the information stored thereon (e.g., Table 2). Then, the changer 23A turns associated one of the switches 31 OFF to prevent the image taken by the disabled camera from being input to the pixel synthesizer 21A.

In the second embodiment, the images are also synthesized using a mapping table as in the first embodiment. However, the second embodiment is different from the first embodiment in that the step S20 of rewriting the mapping data is omitted from the processing flow illustrated in FIG. 7. That is to say, since the input of an image taken by any disabled camera is stopped mechanically or electrically in the second embodiment, obviously there is no need to perform the step S20 of rewriting the mapping data in accordance with the state of a movable part. Consequently, Steps S33 and S35 included in the processing flow shown in FIG. 9 are also omitted in this embodiment.

It should be noted that this second embodiment is easily applicable to an image processing section including no mapping tables.

In the present invention, the display device 3 is typically a liquid crystal display, but may be any other type of display device (e.g., plasma display). Optionally, according to the present invention, the display of a global positioning system (GPS) for vehicles, i.e., a so-called "car navigation system", may also be used as display device 3. Also, the cameras 11 included in the imaging section 1 are typically color or monochrome digital camcorders each including a solid-state imaging device like a CCD or CMOS device. Alternatively, the cameras 11 may also be any other type of imagers.

In the foregoing description, the present invention has been described as being applied to a situation where a change in the state of a movable part like a door or hood of a vehicle alters the position or direction of a camera mounted on that movable part and thereby makes a resultant synthesized image unnatural. However, there are other imaginable situations. For example, if a movable part has changed its state, then the image of the movable part may occupy a different portion of the image taken by a camera mounted on a fixed part, thereby making the resultant synthesized image unnatural. More specifically, the image of an opened door may be unintentionally captured by the camera mounted on the fixed part, not the camera mounted on the movable part that opened.

Even so, a table showing a correspondence between the movable parts and the associated cameras, which are not mounted on those movable parts but should be affected by any state change of the movable parts, has only to be prepared for the changer 23 or 23A instead of Table 2. Then, the same effects as those of the foregoing embodiments are also attainable by performing similar processing steps.

It should be noted that the information representing the state change of a movable part does not have to be digital one (i.e., opened or closed) but may be analog one (e.g., how wide the part is opened). For example, the normal mode still may be selected where a door is slightly open, but should be switched into the alert mode when the angle formed by the opened door with the body of the vehicle exceeds a predetermined threshold value. It should also be noted that the movable parts in the present invention are not limited to doors, hood and trunk but may include tires, antennas, movable rearview mirrors and headlights. For example, where the movement of a tire affects the synthesized image, the display modes may be switched in accordance with the steering angle formed by the wheel on which the tire is fitted.

Furthermore, in the present invention, the "vehicle" means any of various types of vehicles including normal-stroke-volume automobiles, light automobiles, trucks and buses. Also, so long as the inventive concept is implementable, specially equipped vehicles including crane trucks and shovel cars may also be vehicles of the present invention.

In the foregoing description, the monitoring system and image processor of the present invention are supposed to be applied to vehicles. However, the present invention is equally applicable to any other types of moving objects including airplanes, boats and ships. Furthermore, cameras for the inventive monitoring system may be placed on a still object to be monitored, e.g., shops, residences and showrooms.

Moreover, the positions and number of cameras to be mounted are not limited to the illustrated ones.

Furthermore, part or all of the functions of the inventive image processor may be implementable by either dedicated hardware or software programs. It is also possible to use a storage or transmission medium that stores thereon a program for getting the inventive image processing executed by a computer either partially or entirely.

As described above, even if any change in the state of a vehicle movable part has made a synthesized image partially unnatural, that unnatural part can be removed from the synthesized image presented to the viewer in accordance with the present invention. In addition, by switching the display modes of the synthesized image appropriately, it is also possible to let the user know quickly and timely that a movable part is currently in a state unfavorable for vehicle's running, for example.

What is claimed is:

1. An image processor comprising an image processing section, which receives multiple images that have been taken by cameras mounted on a vehicle to monitor surroundings of the vehicle, generates a synthesized image from the multiple images and outputs the synthesized image to a display device, wherein the image processing section switches display modes of the synthesized image in accordance with a state of a movable part of the vehicle, wherein if a change in the state of the movable part has altered the position or direction of at least one of the cameras to make the synthesized image unnatural, the image processing section switches the display modes of the synthesized image form a normal mode into an alert mode.

2. The processor of claim 1, wherein in the alert mode, the image processing section generates the synthesized image without using the image taken by the camera that has had the position or direction thereof changed.

3. The processor of claim 1, wherein in the alert mode, the image processing section does not output the synthesized image.

4. The processor of claim 1, wherein in the alert mode, the image processing section outputs an alert message instead of, or along with, the synthesized image.

5. The processor of claim 1, wherein the movable part comprises at least doors, hood and trunk of the vehicle, and wherein the image processing section switches the display modes of the synthesized image in accordance with opening and closing of the doors, hood or trunk.

6. An image processor comprising an image processing section, which receives multiple images that have been taken by cameras mounted on a vehicle to monitor surroundings of the vehicle, generates a synthesized image from the multiple images and outputs the synthesized image to a display device, wherein the image processing section switches display modes of the synthesized image in accordance with a state of a movable part of the vehicle, wherein if due to a change in the state of the movable part, the image of the movable part occupies a different portion of the image taken by at least one of the cameras to make the synthesized image unnatural, the image processing section switches the display modes of the synthesized image from a normal mode into an alert mode.

7. The processor of claim 6, wherein in the alert mode, the image processing section generates the synthesized image without using the image which has been taken by the camera and the different portion of which the image of the movable part now occupies.

8. The processor of claim 6, wherein in the alert mode, the image processing section does not output the synthesized image.

9. The processor of claim 6, wherein in the alert mode, the image processing section outputs an alert message instead of, or along with, the synthesized image.

10. The processor of claim 6, wherein the movable part comprises at least doors, hood and trunk of the vehicle, and
wherein the image processing section switches the display modes of the synthesized image in accordance with opening and closing of the doors, hood or trunk.

11. A monitoring system comprising:
multiple cameras, mounted on a vehicle, for taking images of surroundings of the vehicle;
a display device; and
an image processing section, which receives the images taken by the cameras, generates a synthesized image from the images and then outputs the synthesized image to the display device,
wherein the image processing section switches display modes of the synthesized image in accordance with a state of a movable part of the vehicle,
wherein if a change in the state of the movable part has altered the position or direction of at least one of the cameras to make the synthesized image unnatural, the image processing section switches the display modes of the synthesized image form a normal mode into an alert mode.

12. A monitoring system comprising:
multiple cameras, mounted on a vehicle, for taking images of surroundings of the vehicle;
a display device; and
an image processing section, which receives the images taken by the cameras, generates a synthesized image from the images and then outputs the synthesized image to the display device,
wherein the image processing section switches display modes of the synthesized image in accordance with a state of a movable part of the vehicles,
wherein if due to a change in the state of the movable part, the image of the movable part occupies a different portion of the image taken by at least one of the cameras to make the synthesized image unnatural, the image processing section switches the display modes of the synthesized image from a normal mode into an alert mode.

\* \* \* \* \*

UNITED STATES PATENT AND TRADEMARK OFFICE
CERTIFICATE OF CORRECTION

| | | |
|---|---|---|
| PATENT NO. | : 6,912,001 B2 | Page 1 of 1 |
| APPLICATION NO. | : 09/866082 | |
| DATED | : June 28, 2005 | |
| INVENTOR(S) | : Shusaku Okamoto et al. | |

It is certified that error appears in the above-identified patent and that said Letters Patent is hereby corrected as shown below:

In the Claims:

Column 14

Line 20, Claim 12: "vehicle" should be --vehicles--.

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,912,001 B2 | Page 1 of 1 |
| APPLICATION NO. | : 09/866082 | |
| DATED | : June 28, 2005 | |
| INVENTOR(S) | : Shusaku Okamoto et al. | |

It is certified that error appears in the above-identified patent and that said Letters Patent is hereby corrected as shown below:

In the Claims:

Column 14

Line 20, Claim 12: "vehicles" should be --vehicle--

Signed and Sealed this

Fifth Day of December, 2006

JON W. DUDAS
*Director of the United States Patent and Trademark Office*